US010929495B2

(12) United States Patent
He (10) Patent No.: US 10,929,495 B2
(45) Date of Patent: Feb. 23, 2021

(54) SYSTEM AND METHOD FOR SYNCHRONIZING INFORMATION ACROSS A PLURALITY OF INFORMATION REPOSITORIES

(71) Applicant: Ficstar Software, Inc., Markham (CA)

(72) Inventor: Wei He, Richmond Hill (CA)

(73) Assignee: FICSTAR SOFTWARE, INC., Markham (CA)

( * ) Notice: Subject to any disclaimer, the term of this patent is extended or adjusted under 35 U.S.C. 154(b) by 1445 days.

(21) Appl. No.: 14/189,844

(22) Filed: Feb. 25, 2014

(65) Prior Publication Data

US 2015/0242435 A1 Aug. 27, 2015

(51) Int. Cl.
G06F 16/955 (2019.01)
G06F 16/27 (2019.01)
G06F 16/951 (2019.01)

(52) U.S. Cl.
CPC ........ G06F 16/9558 (2019.01); G06F 16/273 (2019.01); G06F 16/951 (2019.01)

(58) Field of Classification Search
CPC ......... G06F 17/30575; G06F 17/30371; G06F 17/30174; G06F 17/30578; G06F 16/27; G06F 16/178; G06F 16/2365; G06F 16/273; G06F 16/9558; G06F 16/951
USPC ................................................ 707/610, 617
See application file for complete search history.

(56) References Cited

U.S. PATENT DOCUMENTS

| 8,332,418 | B1* | 12/2012 | Giordani | G06Q 50/01 |
| | | | | 707/706 |
| 8,370,420 | B1* | 2/2013 | Decasper | G06F 16/9574 |
| | | | | 709/202 |
| 8,645,384 | B1* | 2/2014 | Juang | G06F 16/38 |
| | | | | 707/738 |
| 2002/0169748 | A1* | 11/2002 | Macholda | H04L 29/06 |
| 2009/0222493 | A1* | 9/2009 | Smarr | G06F 17/30345 |
| 2009/0300010 | A1* | 12/2009 | Ratnakar | G06Q 30/02 |
| 2010/0094910 | A1* | 4/2010 | Bayliss | G06F 16/283 |
| | | | | 707/800 |
| 2010/0211574 | A1* | 8/2010 | Mislan | G06F 16/337 |
| | | | | 707/748 |
| 2010/0306185 | A1* | 12/2010 | Smith | G06Q 10/107 |
| | | | | 707/709 |
| 2011/0034156 | A1* | 2/2011 | Gatti | H04M 1/56 |
| | | | | 455/415 |
| 2012/0047121 | A1* | 2/2012 | Canel | G06F 16/951 |
| | | | | 707/709 |

(Continued)

Primary Examiner — James Trujillo
Assistant Examiner — Fariborz Khoshnoodi (57) ABSTRACT

A method includes importing a plurality of first information records from one or more information repositories into a central database. The method also includes establishing a link between each of the imported first information records and a corresponding second information record at an external information source. The method further includes, for each first information record, checking for changed information in the corresponding second information record, and when changed information is found, updating the first information record in the central database and updating the first information record in at least one of the one or more information repositories, based on the changed information. The information may include personal or professional contact information.

16 Claims, 3 Drawing Sheets

(56) References Cited

U.S. PATENT DOCUMENTS

| | | | |
|---|---|---|---|
| 2013/0073387 A1* | 3/2013 | Heath | G06Q 50/01 |
| | | | 705/14.53 |
| 2013/0144858 A1* | 6/2013 | Lin | G06F 16/951 |
| | | | 707/709 |
| 2014/0045440 A1* | 2/2014 | Yoshida | H04B 1/401 |
| | | | 455/77 |
| 2014/0222793 A1* | 8/2014 | Sadkin | G06F 16/24578 |
| | | | 707/723 |
| 2016/0180408 A1* | 6/2016 | Memarian | G06Q 30/0276 |
| | | | 705/14.72 |
| 2017/0262545 A1* | 9/2017 | Qu | G06F 16/955 |

* cited by examiner

SYSTEM AND METHOD FOR SYNCHRONIZING INFORMATION ACROSS A PLURALITY OF INFORMATION REPOSITORIES

TECHNICAL FIELD

This disclosure is generally directed to a system and method for maintaining and updating information, such as personal and professional contact information, across a plurality of information repositories.

BACKGROUND

Electronically stored information used by a single individual or business entity is often distributed across a number of information repositories. For example, electronically stored contact information, including personal and professional contact information, is widely used by individuals and business entities to improve communications and relationships with others. Such contact information is often stored in multiple repositories. When individuals or businesses relocate or change telephone numbers, their associated contact information must be updated. For contact databases having hundreds or thousands of records, updates and maintenance becomes an almost contact activity. Improved techniques for maintaining and updating contact information are therefore desirable.

SUMMARY

This disclosure provides a system for synchronizing information, such as contact information, across a plurality of information repositories. By collecting information from multiple information repositories and storing the information in a central contact database, the information can be more easily updated and maintained.

In a first embodiment, a method includes importing a plurality of first contact information records from one or more contact information repositories into a central contact database. The method also includes establishing a link between each of the imported first contact information records and a corresponding second contact information record at an external contact information source. The method further includes, for each first contact information record, checking for changed information in the corresponding second contact information record, and when changed information is found, updating the first contact information record in the central contact database and updating the first contact information record in at least one of the one or more contact information repositories, based on the changed information.

In a second embodiment, an apparatus includes at least one processing device. The at least one processing device is configured to import a plurality of first contact information records from one or more contact information repositories into a central contact database, and establish a link between each of the imported first contact information records and a corresponding second contact information record at an external contact information source. The at least one processing device is also configured to, for each first contact information record, check for changed information in the corresponding second contact information record, and when changed information is found, update the first contact information record in the central contact database and update the first contact information record in at least one of the one or more contact information repositories, based on the changed information.

In a third embodiment, a non-transitory computer readable storage medium includes instructions that, when executed by at least one processing device, cause the at least one processing device to import a plurality of first contact information records from one or more contact information repositories into a central contact database, and establish a link between each of the imported first contact information records and a corresponding second contact information record at an external contact information source. The computer readable storage medium also includes instructions that, when executed by the at least one processing device, cause the at least one processing device to, for each first contact information record, check for changed information in the corresponding second contact information record, and when changed information is found, update the first contact information record in the central contact database and update the first contact information record in at least one of the one or more contact information repositories, based on the changed information.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
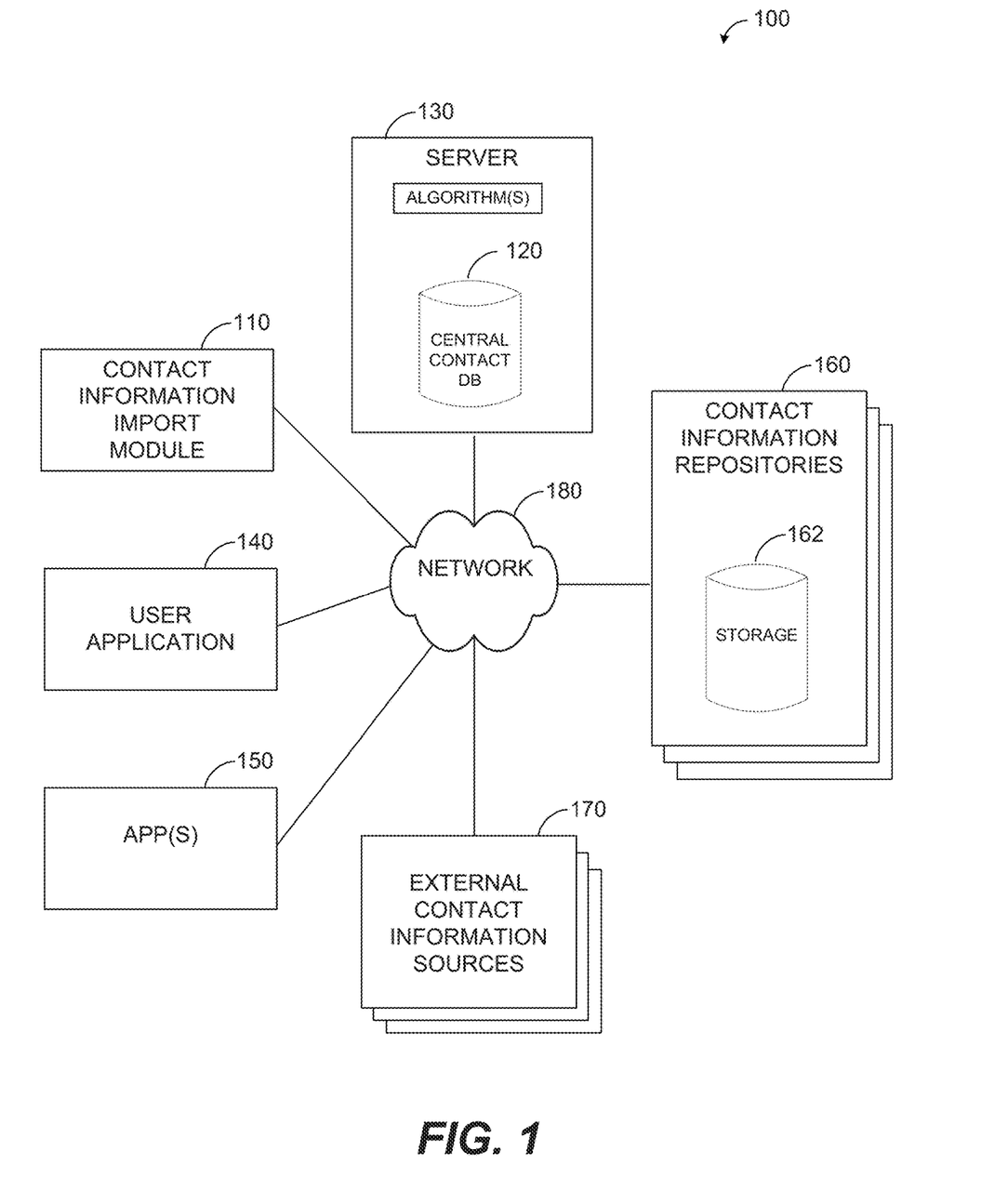
FIG. 1 illustrates an example system that may be used for synchronizing contact information across a plurality of contact information repositories, according to an embodiment of this disclosure.
Figure 2:
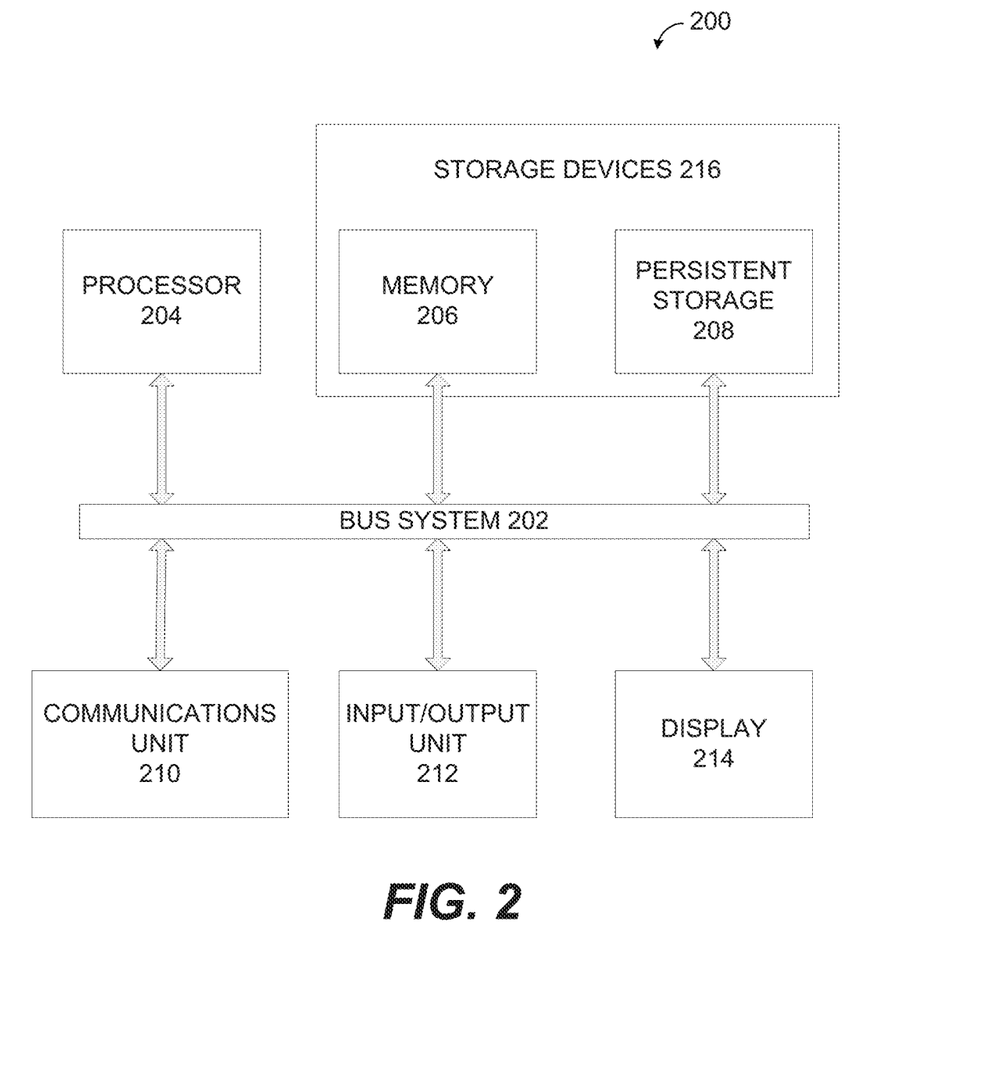
FIG. 2 illustrates an example device that can be used in the example system of FIG. 1, according to an embodiment of this disclosure.
Figure 3:
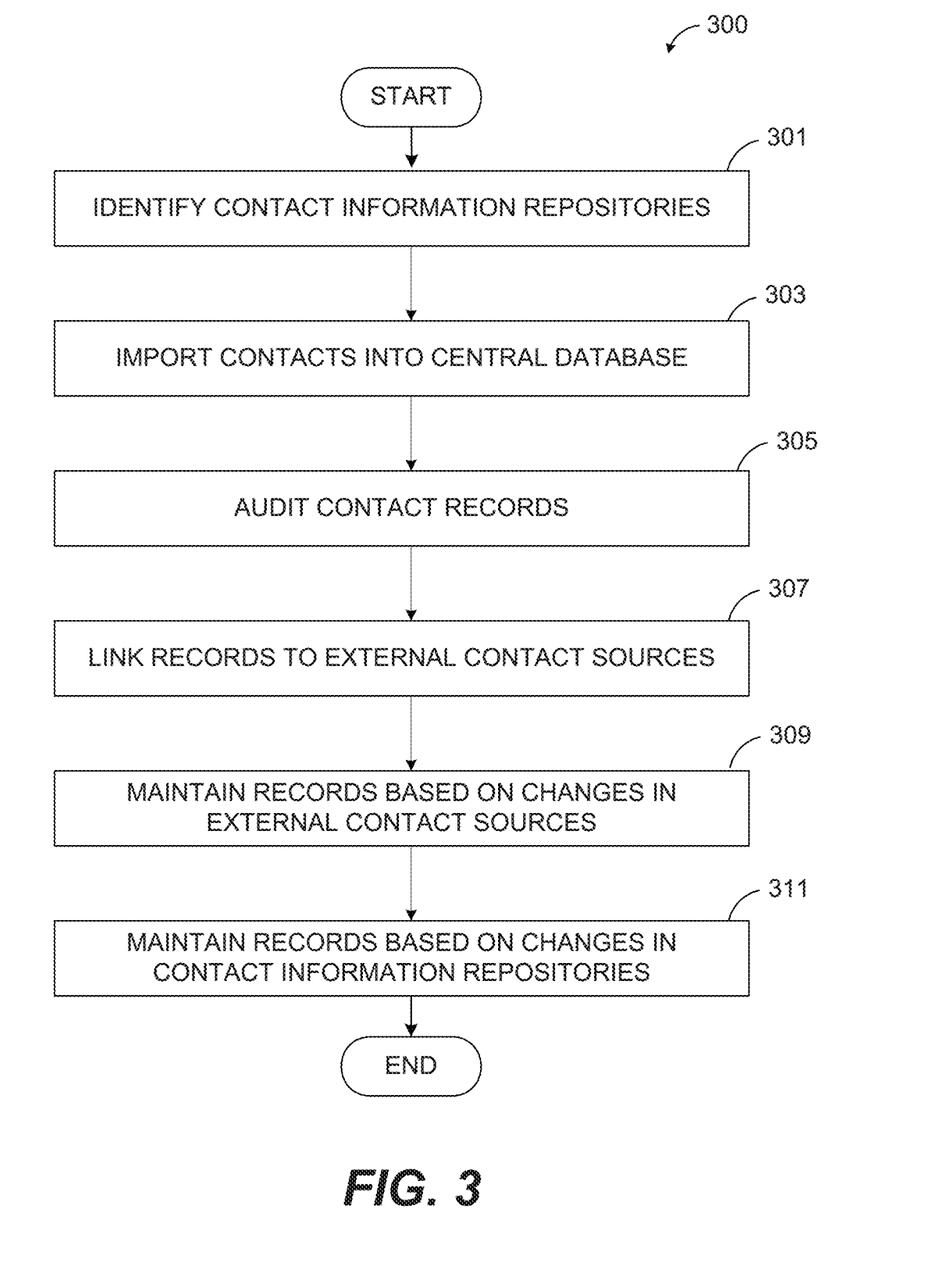
FIG. 3 illustrates an example method for synchronizing contact information across a plurality of contact information repositories, according to an embodiment of this disclosure.

FIGS. 1 through 3, discussed below, and the various embodiments used to describe the principles of the present disclosure in this patent document are by way of illustration only and should not be construed in any way to limit the scope of this disclosure. Those skilled in the art will understand that the principles of the present disclosure may be implemented in any type of suitably arranged device or system.

Electronically stored information intended for use by a single individual or business entity may be stored across multiple information repositories. For example, an individual's aggregate personal and professional contact information may be stored in multiple contact repositories. As another example, e-commerce information, such as information associated with consumer goods or services (e.g., books, clothing, travel reservations, etc.) may be stored at each of multiple websites that sell or advertise the consumer goods or services. As yet another example, a home or vehicle for sale may be listed on a number of different real estate or auto trading websites. Such information can quickly change on one or more information repositories without the change propagating across all information repositories, thereby creating a situation where information is out of synch across the information repositories, and at least one information repository includes outdated or otherwise incorrect information.

The following embodiments are described with respect to electronically stored contact information. However, it will be clear to those of skill in the art that the disclosed embodiments are also applicable in association with other types of information.

Electronically stored contact information, including personal and professional contact information, is widely used by individuals and business entities to improve communications and relationships with others. As used throughout this disclosure, the term contact information refers information used to identify, initiate contact with, or maintain contact with, an individual, group of individuals, or a business or professional entity. Contact information may include information such as home, office, and cellular phone numbers; mailing, shipping, and physical addresses; email and social media addresses; website information; employment, job title, and education information; and any other suitable information associated with an individual, group of individuals, or a business or professional entity.

Many individuals and businesses acquire and maintain contact information for a large number of other individuals or businesses. For example, a salesperson may have tens of thousands of contacts that represent past, present, or potential customers or clients. The salesperson may have the contacts stored across a number of repositories, including one or more contact relationship management (CRM) systems, one or more email systems (e.g., MS-OUTLOOK), one or more social media sites, or any other suitable system.

The contact information stored across the different contact repositories may not always match each other. For example, contact information entered into a CRM system may not be entered into an email system. Moreover, the contact information can very easily become outdated as people change jobs, schools, residences, and phone numbers, and businesses open, close, move, and change phone numbers and websites. For contact databases having hundreds or thousands of records, updates and maintenance becomes an almost contact activity.

To resolve this issue, embodiments of this disclosure provide a system and method for synchronizing contact information across a plurality of contact information repositories. The system and method monitor contact information on a regular, ongoing basis, and automatically update contact information when changes are needed or desired.

FIG. 1 illustrates an example system 100 that may be used for synchronizing contact information across a plurality of contact information repositories, according to an embodiment of this disclosure. The embodiment illustrated in FIG. 1 is for illustration only. Other embodiments could be used without departing from the scope of this disclosure.

As shown in FIG. 1, the system 100 may include a contact information import module 110, a central contact database 120, a server 130, a front end user application 140, one or more downloadable applications 150, contact information repositories 160, external contact information sources 170, and a network 180.

The contact information import module 110 automatically identifies contact information from one or more contact information repositories 160 identified by a user, and imports the contact information into the central contact database 120. The contact information import module 110 may be any computing device that is capable of performing a contact information importing function. For example, the contact information import module 110 may be a server, a desktop computer, or a handheld device, such as a laptop computer, tablet computer, or smart phone. The contact information import module 110 may include one or more application programming interfaces (APIs), web crawler applications, or any other software, firmware, hardware (e.g., one or more processors, controllers, storage devices, and circuitry), or combination thereof, capable of accessing one or more contact information repositories 160 and extracting the contact information from the repositories 160.

The central contact database 120 is a data storage configured to store contact information in a memory. The memory may be embodied in any volatile or non-volatile storage device(s). The central contact database 120 is part of, or communicatively coupled to, the server 130. The server 130 is illustrative of a general purpose or other computing device operating as a local or remote server configured to communicate with, and share data with, the components of the system 100.

The system 100 may include a user application 140 in which a user can manually input and edit contact information from a non-compatible source that is not readily read or imported into the central contact database 120. For example, the user may have a number of business cards or a physical address book that contains contact information to be loaded into the central system. The user application 140 allows the user to manually transfer the contact information into the central contact database 120 by typing, scanning (with optical character recognition (OCR)), speaking (with voice recognition), or any other suitable means of data input. In some embodiments, the user application 140 may be a website or web-based application that a user accesses from a web browser executing on a web-enabled device. In other embodiments, the user application 140 may be downloadable or installable on a user's electronic device, such as a desktop computer, laptop computer, cell phone, smart phone, notebook, net book, or any other suitable wireless or wired electronic device.

The system 100 may optionally include one or more downloadable applications ("apps" or "plug-ins") 150. Each app 150 may be downloadable or installable on a user's electronic device, such as a desktop computer, laptop computer, cell phone, smart phone, notebook, net book, or any other suitable wireless or wired electronic device. Each app 150 is configured to augment the system 100 by facilitating or automating the process of importing contact information from one of the contact information repositories 160 into the central contact database 120. For example, one app may be configured to import contact information from a user's cell phone address book into the central contact database 120. The same or another app may be configured to import contact information from the user's MS-OUTLOOK contact list on the user's desktop or laptop computer. The same or perhaps a third app may be configured to import contact information from a CRM system.

Any of the contact information import module 110, central contact database 120, server 130, user application 140, and app(s) 150 may include communication technology (such as wireless technology) for sharing information with other devices. The communication technology may include any one or more of a variety of integrated user interface units or may be coupled to user interface units through one or more communication ports or data links of the device. Examples of user interface units include a voice input unit (such as a microphone) and physical input units (such as a keyboard, a mouse, a track ball, a rotary dial or wheel, a touchpad, or a touch-screen). Any of these user interface units may be implemented as an external unit that communicates with the contact information import module 110, central contact database 120, server 130, user application 140, and app(s) 150 to provide user input using a wired or wireless communication technology. Examples of wired communication technology include Universal Serial Bus (USB) interface, FireWire interface, etc. Examples of wireless communication technology include Bluetooth, Wi-Fi, WiMax, and infrared.

The contact information repositories 160 represent one or more locations or systems where contact information is kept and maintained in a storage 162. The contact information repositories may include one or more contact relationship management (CRM) systems, one or more email systems (e.g., MS-OUTLOOK), one or more phone contact lists, one or more social media sites, or any other suitable system where a user aggregates, maintains, and uses contact information.

The external contact information sources 170 represent one or more internet-based or web-based locations (e.g., a website) where contact information is found. The external contact information sources 170 may include social media websites (e.g., FACEBOOK, LINKEDIN, TWITTER), professional associations, public information databases (e.g., HOOVER'S, SALES GENIE, INFOUSA), a corporate website containing employee names, and any other suitable web-accessible contact information source.

Communication between the contact information import module 110, central contact database 120, server 130, user application 140, app(s) 150, and contact information repositories 160 is made possible via the network 180. The network 180 may be implemented by any medium or mechanism that provides for the exchange of data between various computing devices. Examples of such a network include a Local Area Network (LAN), Wide Area Network (WAN), Ethernet or the Internet, or one or more terrestrial, satellite, or wireless links. The network 180 may include a combination of two or more networks such as those described. The network 180 may transmit data according to Transmission Control Protocol (TCP), User Datagram Protocol (UDP), and/or Internet Protocol (IP).

In one aspect of operation, a user initiates the import process by identifying one or more contact information repositories 160. This may include the user identifying each repository 160 (e.g., MS-OUTLOOK contacts at work), and supplying any login or identification information associated with accessing the repository 160 (e.g., user name, email address, password, domain name, and the like) to the contact information import module 110. Once each repository 160 is identified, the contact information import module 110 automatically accesses the repository 160, obtains the contact information records from the repository 160, and imports the contact information into the central contact database 120.

Once all contact information records are imported into the central contact database 120, the system 100 audits the records. The audit process "cleans" the data by removing duplicate records and resolving data conflicts between records. For example, one contact record for Joe may have a first email address and a second contact record for Joe may have a second email address. Joe may use two different email addresses, so both of the records may be correct. Or Joe may only use one of the email addresses, so either the first or the second record for Joe may be out of date or incorrect. If a data conflict cannot be resolved automatically, then the system 100 may request information from the user to resolve the data conflict.

The contact records in the central contact database 120 are viewable and maintainable by a user. For example, a user may access the central contact database 120 using the user application 140 to view and maintain the user's contact information records. Using the user application 140, the user can add, delete, update, or query contact information records.

In some embodiments, the system 100 is a public shared system capable of storing and maintaining contact information assembled from contact repositories of many individuals. The many individuals may be friends, family, or colleagues, or may not know each other or be related or associated in any way. For example, Bob can include all of his contacts in the central contact database 120, and Sue (who may or may not know Bob) can also include all of her contacts in the central contact database 120. If Bob and Sue have one or more contacts in common (e.g., Bob and Sue both have Joe as a contact in the central system), only one record for the shared contact(s) is stored in the central contact database 120 (e.g., the database 120 includes only one record for Joe). However, record information associated with the shared contact will indicate that both Bob and Sue know the shared contact(s). Security settings can be customized to keep unauthorized persons from accessing a record, or can give broad public access to a record. Thus, according to some security settings, if Bob and Sue know Joe, but Patty does not know Joe, then Bob and Sue can access Joe's contact information, but Patty cannot. However, according to other security settings, Joe's information may be accessible to anyone who wants to access it.

After each contact information record is imported into the central contact database 120 and audited for accuracy, the system 100 attempts to link each contact information record to contact information records in one or more external contact information sources 170. The external contact information sources 170 may include social media websites, professional associations, public information databases, a website of the contact's employer, and any other suitable web-accessible contact information source.

In one aspect of operation, software executed on the server 130 uses web crawling or internet searching algorithms to access different external contact information sources 170 to find contacts that match one or more contact information records in the central contact database 120. The web crawling algorithms on the server 130 search on key fields in the contact information, such as first and last name, job title, current employer, previous employer(s) and dates employed, school attended and dates attended, and the like. Based on key matches in the information, the server 130 determines whether one or more records in an external contact information source 170 match a corresponding record in the central contact database 120.

For example, assume that the central contact database 120 contains a record for Joe Smith, an engineer living in Chicago, Ill., and employed at ACME Widget Corp. The server 130 uses the web crawling algorithms to access different websites (e.g., FACEBOOK, LINKEDIN, a Chicago public directory, a website of Illinois registered engineers, the corporate website for ACME Widget Corp., and the like) to find information for Joe Smith. Once a contact match is found on an external contact information source 170, the web location of the contact in the external contact information source 170 is linked to the associated contact in the central contact database 120. For example, if the server 130 identifies Joe Smith on FACEBOOK, a URL or hyperlink associated with the Joe Smith record on FACEBOOK is linked to the Joe Smith record in the central contact database 120.

If the algorithm finds several possibilities for a contact match (e.g., five people named Joe Smith in Chicago on LINKEDIN), and the algorithm cannot determine the correct match, the algorithm may present the different possible contact matches to the user, and ask the user for more information to help identify the correct match. In some embodiments, the algorithm may include confidence percentages for each possible contact match, where the confidence percentage indicates how likely that a possible contact match is the correct match, or how much of the known information of the possible contact match matches the information of the known contact in the central contact database 120.

In some embodiments, one or more external contact information sources 170 may include websites in common with one or more of the user's contact information repositories 160. For example, a user may have contact information stored on the user's page on FACEBOOK. Likewise, FACEBOOK may be an external contact information source that is searched by the server 130 to match the contact information in the central contact database 120.

Once links are established between the contact information records in the central contact database 120 and associated contact information records in the external contact information sources 170, then the server 130 regularly searches for updates to the contact information in the external contact information sources 170 in order to maintain the contact information in the central contact database 120. In one aspect of operation, the server 130 periodically accesses each external contact information source 170 according to a predetermined schedule using the links associated with each contact record in the central contact database 120. The server 130 accesses the external contact information source 170 in order to determine if the contact record in the external contact information source 170 has changed. If no change has occurred, then the server 130 takes no action. If, based on a review of the external contact record, the server 130 determines a change in the contact has occurred, the server 130 attempts to update the associated record in the central contact database 120.

For example, based on the Joe Smith contact information record in the central contact database 120, the server 130 regularly accesses the identified contact information record(s) for Joe Smith in FACEBOOK, INFOUSA, and any other linked external contact information source 170. If the Joe Smith record in FACEBOOK indicates that Joe Smith has moved to Dallas, Tex., then the server 130 updates the Joe Smith record in the central contact database 120 to reflect Joe Smith's new Dallas address.

In addition to updating records in the central contact database 120, the server 130 also updates the corresponding records in the user's contact information repositories 160. Thus, using the above example, when the server 130 updates the Joe Smith record in the central contact database 120 to reflect Joe Smith's new Dallas address, the server 130 also updates, for example, the Joe Smith record in the MS-OUTLOOK contacts on the user's desktop computer, the Joe Smith record on the user's smart phone, and any other Joe Smith record that is located in one or more of the user's contact information repositories 160. If more than one user has contact information for Joe Smith (e.g., both Bob and Sue have Joe Smith as a contact in their respective contact sources), then the server updates the Joe Smith records in each user's personal contact information repositories 160.

In some embodiments, the server 130 provides a notification to the user whenever a contact's information has changed. In some embodiments, the server 130 automatically updates the contact information in the contact information repositories 160 and provides a notification to the user of the automatic update. In other embodiments, the server 130 first asks the user if the user wants to update the contact information in the user's contact information repositories 160, and then updates the contact information only upon approval from the user. For some non-compatible contact information repositories 160 (i.e., a physical address book), the server 130 simply notifies the user of the contact information change, and the user can make the change manually in the non-compatible source.

The server 130 repeatedly monitors the external contact information sources 130 using the web crawling or internet search algorithms as described above. The server 130 determines an appropriate frequency to search each external contact information source 160, and according to the determined frequency, accesses the source 160 and searches for updates using the links developed earlier. The frequency can be determined and adjusted based on one or more rules associated with the status of each contact and each external source 160. For example, an inactive contact in FACEBOOK or LINKEDIN may be reviewed much less frequently than an active contact that regularly updates his or her page. Likewise, an employer or corporate website may be reviewed or accessed less frequently than a social media site based on a rule that a contact may change employers less frequently than the contact changes, e.g., a personal email address.

In addition to the central contact database 120 being maintained based on contact changes found in the external contact information sources 170, the central contact database 120 is also maintained based on changes to a user's contact information repositories 160. In one aspect of operation, once the contact information import module 110 and the app(s) 150 import contact information records from the contact information repositories 160 into the central contact database 120, the import module 110 and app(s) 150 also maintain the central contact database 120. For example, if a MS-OUTLOOK-compatible app 150 was used to import contacts from a user's MS-OUTLOOK account into the central contact database 120, then the same app 150 can execute continuously or regularly to check new incoming and outgoing emails in the user's MS-OUTLOOK account to determine if a new contact should be created or an existing contact should be updated in the central contact database 120. In some embodiments, this can be performed by parsing information from the body, header, or signature of each email. This contact maintenance operation can also apply to the user's text messages, other email systems, or any other contact information repositories 160.

Although several of the contact information maintenance operations are described as being performed by the server 130, one or more operations described above may be performed by one or more other components of the system 100. For example, instead of or in addition to the server 130, the contact information import module 110 may also update the contact information repositories 160 when updated contact information is found in the external contact information sources 170.

Although FIG. 1 illustrates one example of a system 100 that can be used for synchronizing contact information across a plurality of contact information repositories, various changes may be made to FIG. 1. For example, certain ones of the various components of system 100 (the information import module 110, central contact database 120, server 130, front end user application 140, downloadable applications 150, contact information repositories 160, external contact information sources 170, and network 180) may be combined, rearranged, duplicated, separated into sub-components, or replaced with other components.

FIG. 2 illustrates an example device 200 that can be used in the system 100 in accordance with this disclosure. The device 200 could represent any of the information import module 110, server 130, front end application 140, or apps 150 in FIG. 1.

In this example, the device 200 includes a bus system 202. The bus system 202 supports communication between a processing unit 204, a memory 206, a persistent storage 208, a communications unit 210, an input/output (I/O) unit 212, and a display or display interface 214. Any suitable bus or buses could be used here.

The processing unit 204 processes software instructions loaded into the memory 206. The processing unit 204 may include a single processor, multiple processors, one or more multi-processor cores, or other type of processor depending on the particular implementation. As an example, the processing unit 204 may be implemented using a number of heterogeneous processor systems in which a main processor is present with secondary processors on a single chip. As another example, the processing unit 204 may be a symmetric multi-processor system containing multiple processors of the same type. Any suitable processing device(s) could be used.

The memory 206 and the persistent storage 208 are examples of storage devices 216. A storage device is any piece of hardware capable of storing information, such as data, program code, and/or other suitable information on a temporary or permanent basis. The memory 206 may be a random access memory or other volatile or non-volatile storage device(s). The persistent storage 208 may contain one or more components or devices, such as a hard drive, flash memory, optical disc, or other persistent storage device(s). A storage device may be fixed or removable, such as when a removable hard drive or USB thumb drive is used.

The communications unit 210 provides for communications with other systems or devices. For example, the communications unit 210 could include a network interface card or a wireless transceiver. The communications unit 210 may provide communications through physical or wireless communications links.

The I/O unit 212 allows for input and output of data using other components connected to or integrated within the device 200. For example, the I/O unit 212 may provide a connection for user input through a keyboard, mouse, touchscreen, or other input device. The I/O unit 212 may also send output to a display, printer, or other output device. The I/O unit 212 could alternatively include a keyboard, mouse, or other input or output device(s). If the device 200 includes a display 214, the display 214 provides a mechanism to visually present information to a user. The display 214 could represent a touchscreen.

Program code for an operating system, applications, or other programs may be located in the storage devices 216, which are in communication with the processing unit 204 through the bus system 202. Instructions forming the programs may be loaded into the memory 206 for processing by the processing unit 204.

Although FIG. 2 illustrates one example of a device 200 that can be used in the system 100, various changes may be made to FIG. 2. For example, FIG. 2 is simply meant to illustrate possible components in one specific implementation. Each of the components 110, 130 in FIG. 1 could be implemented in other ways, such as other ways that incorporate one or more processing units, one or more memory units storing data and instructions used/generated/collected by the processing unit(s), and one or more interfaces for communicating over the network 120.

FIG. 3 illustrates an example method 300 for synchronizing contact information across a plurality of contact information repositories, according to an embodiment of this disclosure. The embodiment illustrated in FIG. 3 is for illustration only. Other embodiments could be used without departing from the scope of this disclosure. The method 300 could, for example, be performed by the system 100 of FIG. 1.

At operation 301, one or more contact information repositories (e.g., contact information repositories 160) are identified. This may include a user identifying each repository and supplying any login or identification information associated with accessing the repository (e.g., user name, email address, password, domain name, and the like) to a contact information import module (e.g., contact information import module 110) or app (e.g., app 150).

At operation 303, contacts from each of the contact information repositories are imported into a central contact database (e.g., central contact database 120). This may include the contact information import module or app automatically accessing each repository, obtaining the contact information records from the repository, and importing the contact information into the central contact database.

At operation 305, the contact records in the central contact database are audited. The audit process "cleans" the data by removing duplicate records and resolving data conflicts between records.

At operation 307, each contact information record in the central contact database is linked to contact information records in one or more external contact information sources (e.g., external contact information sources 170). This may include finding multiple possible matches, resolving conflicts between possible matches, and determining one or more correct matches.

At operation 309, an update process (e.g., an update process executing on the server 130) regularly accesses the external contact information sources and searches for changes to the contact information in the external contact information sources in order to maintain the contact information in the central contact database and the contact information repositories. If a change to a contact is identified in an external contact information source, the change is made to the corresponding records in the central contact database and the contact information repositories.

At operation 311, an update process (e.g., an update process executing on the contact information import module 110 or app(s) 150) maintains the central contact database by regularly accessing the contact information repositories and determining if a new contact should be created or an existing contact should be updated in the central contact database.

Although FIG. 3 illustrates one example of a method 300 for synchronizing contact information across a plurality of contact information repositories, various changes may be made to FIG. 3. For example, various operations shown in FIG. 3 could overlap, occur in parallel, or occur multiple times. Moreover, some operations could be combined or removed and additional operations could be added.

The embodiments above have been described with respect to contact information; however this disclosure is not limited thereto. For example, instead of contact information, the relevant information could be related to a vehicle that is offered for sale. The vehicle is identified by a vehicle identification number (YIN), and is offered for sale by the vehicle's owner. However, the vehicle may be listed for sale on multiple websites, such as CARS.COM and AUTOTRADER.COM, where each website tracks the vehicle by the YIN. If information regarding the vehicle (e.g., price, mileage, condition, etc.) changes on one website, the embodiments of this disclosure can be used to track the information change and ensure that the information change is propagated across the other websites where the vehicle is listed for sale. Such a scenario would also be applicable for real estate offered for sale or lease.

As another example, instead of contact information, the relevant information could be related to a job posting at a company. The job posting could be identified by a job posting number or other identifier, and be listed on multiple websites, such as CAREERBUILDER.COM, MONSTER.COM, and the company's website. If information regarding the job posting (e.g., salary, job description, etc.) changes on one website, the disclosed embodiments can be used to track the information change and ensure that the information change is propagated across the other websites where the job posting is listed.

In still other examples, the relevant information could be related to travel services (e.g., airline ticket pricing and inventory), e-commerce (e.g., pricing information of books identified by an International Standard Book Number (ISBN) or consumer goods identified by Universal Product Code (UPC) barcode), or any other information that can be identified by one or more key attributes, where the information is subject to change across different repositories.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
importing, into a central contact database, a first plurality of first contact information records from a first contact information repository associated with a first user and a second plurality of first contact information records from a second contact information repository associated with a second user, wherein at least one of the first and second contact information repositories comprises a contact relationship management (CRM) system;
storing, in the central contact database, only one instance of a first record, among the first contact information records, that is common to the first user and the second user after removing one or more duplicates of the first record;
establishing a link between each of the imported first contact information records and a corresponding second contact information record at an external contact information source, the external contact information source comprising a website; and
for each first contact information record:
checking for changed information in the corresponding second contact information record by periodically accessing the second contact information record at the website using a web crawling algorithm and determining if any contact information in the second contact information record has changed since a previous access of the second contact information record; and
when changed information is found, updating the first contact information record in the central contact database and updating the first contact information record in at least one of the first or second contact information repositories, based on the changed information,
wherein the second contact information record is periodically accessed at the website by the web crawling algorithm at a predetermined frequency, wherein the predetermined frequency is determined based on how often the second contact information record or the website is updated.

2. The method of claim 1, wherein the at least one of the first and second contact information repositories further comprises at least one of: an email system, a phone contact list, and a social media site.

3. The method of claim 1, wherein the website of the external contact information source is associated with at least one of: a social media website, a professional association, a public information database, and a corporate website.

4. The method of claim 1, wherein establishing a link comprises determining a URL or hyperlink associated with the second contact information record at the website and storing the URL or hyperlink with the first contact information record in the central contact database.

5. The method of claim 1, wherein the central contact database comprises at least one security setting that (i)

allows access to the first record by the first user and the second user, and (ii) restricts access to the first record by a third user when the first record is not part of a third contact information repository associated with the third user.

6. A system comprising:
at least one processing device configured to:
import, into a central contact database, a first plurality of first contact information records from a first contact information repository associated with a first user and a second plurality of first contact information records from a second contact information repository associated with a second user, wherein at least one of the first and second contact information repositories comprises a contact relationship management (CRM) system;
store, in the central contact database, only one instance of a first record, among the first contact information records, that is common to the first user and the second user after removing one or more duplicates of the first record;
establish a link between each of the imported first contact information records and a corresponding second contact information record at an external contact information source, the external contact information source comprising a website; and
for each first contact information record:
check for changed information in the corresponding second contact information record by periodically accessing the second contact information record at the website using a web crawling algorithm and determining if any contact information in the second contact information record has changed since a previous access of the second contact information record; and
when changed information is found, update the first contact information record in the central contact database and update the first contact information record in at least one of the first or second contact information repositories, based on the changed information,
wherein the at least one processing device periodically accesses the second contact information record at the website by the web crawling algorithm at a predetermined frequency, wherein the predetermined frequency is determined based on how often the second contact information record or the website is updated.

7. The system of claim 6, wherein the at least one of the first and second contact information repositories further comprises at least one of: an email system, a phone contact list, and a social media site.

8. The system of claim 6, wherein the website of the external contact information source is associated with at least one of: a social media website, a professional association, a public information database, and a corporate website.

9. The system of claim 6, wherein the at least one processing device is configured to establish the link by determining a URL or hyperlink associated with the second contact information record at the website and storing the URL or hyperlink with the first contact information record in the central contact database.

10. The system of claim 6, wherein the central contact database comprises at least one security setting that (i) allows access to the first record by the first user and the second user, and (ii) restricts access to the first record by a third user when the first record is not part of a third contact information repository associated with the third user.

11. A non-transitory computer readable storage medium comprising instructions that, when executed by at least one processing device, cause the at least one processing device to:
import, into a central contact database, a first plurality of first contact information records from a first contact information repository associated with a first user and a second plurality of first contact information records from a second contact information repository associated with a second user wherein at least one of the first and second contact information repositories comprises a contact relationship management (CRM) system;
store, in the central contact database, only one instance of a first record, among the first contact information records, that is common to the first user and the second user after removing one or more duplicates of the first record;
establish a link between each of the imported first contact information records and a corresponding second contact information record at an external contact information source, the external contact information source comprising a website; and
for each first contact information record:
check for changed information in the corresponding second contact information record by periodically accessing the second contact information record at the website using a web crawling algorithm and determining if any contact information in the second contact information record has changed since a previous access of the second contact information record; and
when changed information is found, update the first contact information record in the central contact database and update the first contact information record in at least one of the first or second contact information repositories, based on the changed information,
wherein the second contact information record is periodically accessed at the website by the web crawling algorithm at a predetermined frequency, wherein the predetermined frequency is determined based on how often the second contact information record or the website is updated.

12. The computer readable storage medium of claim 11, wherein the at least one of the first and second contact information repositories further comprises at least one of: an email system, a phone contact list, and a social media site.

13. The computer readable storage medium of claim 11, wherein the website of the external contact information source is associated with at least one of: a social media website, a professional association, a public information database, and a corporate website.

14. The computer readable storage medium of claim 11, further comprising instructions that, when executed by the at least one processing device, cause the at least one processing device to establish the link by determining a URL or hyperlink associated with the second contact information record at the website and storing the URL or hyperlink with the first contact information record in the central contact database.

15. The method of claim 1, wherein the second contact information record is periodically accessed at the website at a first frequency when the second contact information record or the website is updated regularly, and the second contact information record is periodically accessed at the website at a second frequency when the second contact information record or the website is updated less regularly.

16. The method of claim 1, wherein the link between each first contact information record and the corresponding second contact information record comprises a confidence percentage indicating how much information of the corresponding second contact information record matches information of the first contact information record.

\* \* \* \* \*